United States Patent
Reihs et al.

(10) Patent No.: US 6,485,836 B2
(45) Date of Patent: *Nov. 26, 2002

(54) COMPOSITE MATERIAL COMPRISING POLYURETHANE AND AT LEAST ONE THERMOPLASTIC PLASTICS MATERIAL, A PROCESS FOR THE PRODUCTION THEREOF AND THE USE THEREOF IN MOTOR VEHICLES

(75) Inventors: Karsten Reihs, Köln (DE); Flore Kempkes, Augsburg (DE); Burkhard Köhler, Leverkusen (DE); Holger Warth, Dormagen (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/573,710

(22) Filed: May 18, 2000

(65) Prior Publication Data

US 2002/0064659 A1 May 30, 2002

(30) Foreign Application Priority Data

May 26, 1999 (DE) .......................... 199 24 091

(51) Int. Cl.$^7$ .......................... B32B 27/40; B32B 27/20
(52) U.S. Cl. ................ 428/423.5; 428/412; 428/423.7; 428/424.2; 428/424.8; 428/425.9; 428/403; 428/404; 428/405; 428/406; 428/407; 525/467; 525/452
(58) Field of Search .......................... 428/423.5, 423.7, 428/424.2, 424.8, 425.9, 412, 403, 404, 405, 406, 407; 525/467, 452

(56) References Cited

U.S. PATENT DOCUMENTS

5,286,521 A * 2/1994 Matsuda et al. ............ 427/146
5,364,669 A * 11/1994 Sumida et al. ................ 428/1
5,965,233 A * 10/1999 Tojo et al. ................... 428/141

FOREIGN PATENT DOCUMENTS

EP 0 359 362 3/1990
EP 0 449 017 10/1991
EP 0 794 222 9/1997

OTHER PUBLICATIONS

Patent Abstracts of Japan, vol. 017, No. 181 (M–1394), Apr. 8, 1993 & JP 04 336227 A (Toray Ind Inc), Nov. 24, 1992 *Zusammenfassung*.
Patent Abstracts of Japan, vol. 017, No. 135 (C–1037), Mar. 19, 1993 & JP 04 309551 A (Toray Ind Inc), Nov. 2, 1992 *Zusammenfassung*.

* cited by examiner

Primary Examiner—Nathan M. Nutter
Assistant Examiner—Melanie Bissett
(74) Attorney, Agent, or Firm—Joseph C. Gil; N. Denise Brown

(57) ABSTRACT

A composite material is described which comprises at least two layers of different plastics materials which are directly bonded to each other, wherein A) one layer of the composite comprises polyurethane, and B) a layer of the composite which is directly bonded to layer A) comprises a thermoplastic plastics material which is different from the material which layer A) comprises, wherein layer A) contains homogeneously distributed particles, which are at least coated with a thermoplastic plastics material which is different from the material comprising layer A), and which have a particle size of $\leq 50$ nm, wherein the total surface area of the particles corresponds at least to the extent of the total interface between layers A) and B). A process for the production of these composites is also described, as is the use of these composites in motor vehicle construction.

6 Claims, No Drawings

COMPOSITE MATERIAL COMPRISING POLYURETHANE AND AT LEAST ONE THERMOPLASTIC PLASTICS MATERIAL, A PROCESS FOR THE PRODUCTION THEREOF AND THE USE THEREOF IN MOTOR VEHICLES

BACKGROUND OF THE INVENTION

The present invention relates to composite materials comprising at least two different layers of plastics material which are directly bonded to each other, wherein one layer comprises polyurethane and the layer which is directly bonded thereto comprises a thermoplastic plastics material which is different than the polyurethane layer.

It is known that composites comprising a thermoplastic material and a polyurethane, particularly a polyurethane foam, do not exhibit satisfactory bonding of the composite. In particular, this is because unreacted, low molecular weight reaction components segregate at the interfaces between the layers as residues from the production of the plastics materials. Accordingly, there have been numerous attempts aimed at improving the bonding of composites by the use of bonding agent layers. This is not desirable, however, for uses in the motor vehicle industry, where composite materials are increasingly being employed, since as few as possible different materials should be used in this area on account of the options for reprocessing and recycling which are required.

Therefore, one object of the present invention was to improve the composite bonding between a layer of polyurethane and a layer of a thermoplastic material which is directly bonded thereto.

This object is achieved according to the invention by the provision of a composite material which comprises at least two layers which are directly bonded to each other, comprising A) one layer comprising polyurethane,
and
B) a second layer which is directly bonded to the polyurethane layer A) and comprises a thermoplastic plastics material which is different than the polyurethane layer A), wherein layer A) contains homogeneously distributed particulate material having a particle size within the range of $\leq 50$ nm, preferably within the range of from 1 to 10 nm, and the particles are at least coated with a thermoplastic plastics material which is different from A), preferably with the thermoplastic plastics material of layer B), and the total surface area of the particles corresponds at least to the extent of the total interface between layers A) and B).

The particles can comprise a core of what is preferably an inorganic material, most preferably comprising at least one oxide, hydrated oxide, nitride or carbide of silicon, aluminium, titanium, zirconium, cerium or bromine, particularly as $Al_2O_3$, $SiO_2$, $CeO_2$, $ZrO_2$, $TiO_2$ or titanium nitride, wherein the core can optionally have a porous structure.

The core most preferably consists of $SiO_2$ or Aerosil, which optionally has a porous structure with a smooth surface.

The core is coated with a thermoplastic plastics material which is different from the material of layer A), i.e. the polyurethane layer, and is preferably coated with the thermoplastic plastics material which forms the basis of layer B). A polycarbonate of the type described below is most preferably used here as the thermoplastic plastics material.

The particles can also consist of a plastics material which is completely different from layer A), i.e., the polyurethane layer, and preferably consist of a plastics material which is identical, at least in part, to layer B). The particles most preferably consist essentially of polycarbonate, polyester carbonate or poly(meth)acrylates of the type described below.

The particles have a size $\leq 50$ nm, preferably within the range of from 1 to 10 nm. The particle size is determined by known methods, such as, for example, transmission electron microscopy, sedimentation using ultracentrifuges, light scattering, or Fraunhofer diffraction.

The total surface area of the particles, as determined by nitrogen adsorption isotherms using the BET method, should correspond at least to the interfacial area between the bonded layers A) and B). The surface area of the particles is preferably greater than the extent of the interfacial area between layers A) and B), more preferably at least 10 times greater than the interfacial area, and most preferably 100 times greater than the interfacial area, provided that there is no discernible impairment of the mechanical properties of the composites.

The polyurethanes or polyurethane-ureas which are used as layer A) in accordance with the present invention are obtained by the reaction of one or more polyisocyanates with one or more polyfunctional compounds which contain active hydrogen, preferably polyols.

The preferred polyisocyanates are those which are known from polyurethane chemistry and which are customarily used therein. In particular, these comprise polyisocyanates with an aromatic basis, e.g. 2,4-diisoyanatotoluene and industrial mixtures thereof with 2,6-diisocyanatotoluene, 4,4'-diisocyanatodiphenylmethane and mixtures thereof with the corresponding 2,4'- and/or 2,2'-isomers, polyisocyanate mixtures of the diphenylmethane series, such as those which can be obtained in the known manner by the phosgenation of aniline/formalde-hyde condensates, modified products of these industrial polyisocyanates which contain biuret or isocyanate groups, and particularly NCO prepolymers of the aforementioned type which are based firstly on said industrial polyisocyanates and secondly on the simple polyols and/or polyether polyols and/or polyester polyols which are described below as component, as well as any mixtures of isocyanates of this type provided that they are sufficiently stable on storage.

Amongst the high molecular weight, modified polyisocyanates, the prepolymers which are known from polyurethane chemistry, which comprise terminal isocyanate groups and which have number average molecular weights ranging from 400 to 10,000 g/mol, preferably from 600 to 8000 g/mol, are of particular interest. These compounds are produced in the known manner by the reaction of excess amounts of simple polyisocyanates of the type cited above by way of example with organic compounds comprising at least two groups which are capable of reacting with isocyanate groups, particularly organic polyhydroxyl compounds. Suitable polyhydroxyl compounds of this type include both simple polyhydric alcohols having number average molecular weights in the range of 62 to 599, preferably 62 to 200, such as ethylene glycol, trimethylolpropane, 1,2-propanediol, 1,4-butanediol or 2,3-butanediol, and relatively high molecular weight polyether polyols and/or polyester polyols of the type known from polyurethane chemistry, having number average molecular weights of from 600 to 8000, preferably 800 to 4000, and which contain at least two, generally 2 to 8, preferably 2 to 4, primary and/or secondary hydroxyl groups. NCO prepolymers can also of course be used which are obtained, for example, from low molecular weight (number average) polyisocyanates of the type cited by way of example and from less preferred compounds which contain groups that are capable of reacting with isocyanate groups, such as polythioether polyols, polyacetals which contain hydroxyl groups, polyhydroxy polycarbonates, polyester amides which contain hydroxyl groups, or copolymers, which contain hydroxyl groups, of olefinically unsaturated compounds.

The compounds disclosed in U.S. Pat. No. 4,218,543, the disclosure of which is herein incorporated by reference, are examples of suitable compounds which contain groups which are capable of reacting with isocyanate groups and which are suitable for the production of NCO prepolymers. During the production of these NCO prepolymers, these compounds which contain groups capable of reacting with isocyanate groups are reacted with simple polyisocyanates of the type cited above by way of example, while maintaining an excess of NCO. The NCO prepolymers generally have an NCO content of 10 to 25% by weight, preferably 15 to 22% by weight. It follows from this that, in the context of the present invention, the expressions "NCO prepolymers" and "prepolymers comprising terminal isocyanate groups" are to be understood to comprise both the reaction products as such and mixtures thereof with excess amounts of unreacted polyisocyanate starting materials, which are commonly referred to as "semi-prepolymers".

The polyisocyanate component has an average functionality of 2 to 3, preferably of 2.3 to 2.7.

In order to obtain a defined NCO content of the isocyanate component, it may be useful to mix proportions of crude MDI with an NCO prepolymer. The proportions of material of higher functionality (i.e., functionality>4) which are contained in MDI can be tolerated without difficulty provided that an average functionality of 3 is not exceeded for the isocyanate component.

Suitable aliphatic diols characterized by an OH number greater than about 200 mg KOH/g, preferably >500 mg KOH/g include customary chain extenders which are known in polyurethane chemistry, such as, for example, ethylene glycol, diethylene glycol, propylene glycol, dipropylene glycol, 1,4-butanediol and 1,3-propanediol. Diols are preferred which exhibit an enhanced compatibility with polyols of the isocyanate-reactive component. Examples of these suitable diols include compounds such as 2-butenediol-1,4, 1,3-butanediol, 2,3-butanediol, butanediol-1,4 and 2-methyl-propanediol-1,3. It is also possible, of course, to use these aliphatic diols in admixture with each other.

Suitable active hydrogen components include polyols characterized by an average OH number of 5 to 500 mg KOH/g and an average functionality of 2 to 4. Those polyols having an average OH number of 10 to 50 mg KOH/g and an average functionality of 2.7 to 3 are preferred. Examples of polyols such as these include the polyhydroxy polyethers which are known from polyurethane chemistry and which can be obtained by the alkoxylation of suitable starter molecules such as ethylene glycol, diethylene glycol, 1,4-dihydroxybutane, 1,6-dihydroxyhexane, dimethylolpropane, glycerol, pentaerythritol, sorbitol or saccharose. Ammonia, or amines such as ethylenediamine, hexamethylenediamine, 2,4-diaminotoluene or aniline, or amino alcohols or phenols such as bisphenol A, can also be used as starter molecules. Alkoxylation is typically effected using propylene oxide and/or ethylene oxide, in an arbitrary sequence.

Polyols which are also suitable are polyester polyols such as those which can be obtained in the known manner by the reaction of low molecular weight alcohols with polybasic carboxylic acids, such as adipic acid, phthalic acid, hexahydrophthalic acid, tetrahydrophthalic acid or the anhydrides of these acids, provided that the viscosity of the active hydrogen compound is not too high. One preferred polyol which contains ester groups is castor oil. Preparations which comprise castor oil, such as those which can be obtained by the dissolution of resins, e.g., of aldehyde-ketone resins, are also suitable, as are modifications of castor oil and polyols based on other natural oils.

High molecular weight polyhydroxy polyethers in which high molecular weight polyaddition products or polycondensates or polymers are present in finely dispersed, dissolved or grafted-on form are also suitable. Modified polyhydroxy compounds of this type are obtained in the known manner by, for example, polyaddition reactions (e.g. reactions between polyisocyanates and amino-functional compounds) or polycondensation reactions (e.g., reactions between formaldehyde and phenols and/or amines) proceeding in situ in compounds which contain hydroxyl groups. It is also possible, however, to mix the final aqueous dispersion of polymer with a polyhydroxyl compound, followed by the removal of water from the mixture.

Polyhydroxyl compounds which are modified with vinyl polymers, such as those which are obtained by the polymerization of styrene and acrylonitrile in the presence of polyethers or polycarbonate polyols for example, are also suitable for the production of polyurethanes. If polyether polyols are used which have been modified according to DE-A 2 442 101, 2 844 922 and 2 646 141, by graft polymerization with esters of vinylphosphonic acid and optionally with (meth)acrylonitrile, (meth)acrylamide or OH-functional esters of (meth)acrylic acid, the resultant plastics materials are particularly flame-retardant.

Representatives of the aforementioned compounds which can be used as active hydrogen compounds are described, for example, in High Polymers, Vol. XVI, "Polyurethanes Chemistry and Technology", Saunders-Frisch (Editor) Interscience Publishers, New York, London, Volume 1, pages 32–42, 44–54 and Volume II, 1984, pages 5–6 and pages 198–199.

Mixtures of the compounds listed above can also, of course, be used.

The restriction on the average OH number and average functionality of the active hydrogen component results, in particular, from the increasing brittleness of the resulting polyurethane. However, the possible effects on the polymer physical properties of the polyurethane are known in principle to one skilled in the art, so that the NCO component, the aliphatic diol and the polyol can be matched to each other in a favorable manner.

Layer A) of the composite can exist in a foamed or solid form, e.g. as a lacquer or coating.

All adjuvant substances and additives which are known in the art, such as parting agents, foaming agents, fillers, catalysts and flame retardants, can be used for the production thereof.

Substances which can optionally be used as adjuvant substances and additives include:

a) water and/or readily volatile inorganic or organic substances, which can be used as foaming agents. Examples of organic foaming agents include compounds such as acetone, ethyl acetate, halogen-substituted alkanes such as methylene chloride, chloroform, ethylidene chloride, vinylidene chloride, monofluoro-trichloromethane, chlorodifluoromethane and dichlorodifluoromethane, as well as butane, hexane, heptane or diethyl ether; examples of inorganic foaming agents include, for example, air, $CO_2$ or $N_2O$. A foaming effect can also be achieved by the addition of compounds which decompose at temperatures above room temperature with the evolution of gases such as, for example, of nitrogen. Examples thereof include azo compounds such as azodicarbonamide or azoisobutyronitrile.

b) Catalysts of the type known in the art, e.g. tertiary amines such as triethylamine, tributylamine, N-methyl-morpholine, N-ethyl-morpholine, N,N,N',N'-tetramethylethylenediamine, pentamethyl-diethylenetriamine and higher homologues, 1,4-diaza-bicyclo-(2,2,2)-octane, N-methyl-N'-dimethyl-amino-ethyl-piperazine, bis-(dimethylaminoalkyl)piperazine, N,N-dimethyl-benzylamine, N,N-dimethylcyclo-hexylamine, N,N-diethylbenzylamine, bis-(N,N-diethyl-aminoethyl) adipate, N,N,N',N'-tetramethyl-1,3-butanediamine, N,N-dimethyl-β-phenyl-ethylamine, 1,2-dimethylimidazole, 2-methyl-imidazole, monocyclic and bicyclic amidines, bis-(dialkylamino) alkyl ethers, and tertiary amines which contain amide groups (preferably formamide groups). Suitable catalysts also include Mannich bases which are known in the art, comprising secondary amines, such as dimethylamine, and aldehydes, preferably formaldehyde, or ketones such as acetone, methyl ethyl ketone or cyclohexanone, and phenols such as phenol, nonylphenol or bisphenol.

Example of tertiary amines which contain active hydrogen atoms which react with isocyanate groups and which can be used as catalysts include compounds such as, for example, triethanolamine, triisopropanol-amine, N-methyl-diethanolamine, N-ethyl-diethanolamine, N,N-dimethyl-ethanolamine, and reaction products thereof with alkylene oxides such as propylene oxide and/or ethylene oxide, as well as secondary-tertiary amines.

Other suitable catalysts include the silaamines comprising carbon-silicon bonds which are known in the art, e.g., 2,2,4-trimethyl-2-silamorpholine and 1,3-diethyl-aminomethyl-tetramethyl-disiloxane.

Further substances which are suitable as catalysts include nitrogen-containing bases such as tetraalkylammonium hydroxide, and also alkali hydroxides such as sodium hydroxide, alkali phenolates such as sodium phenolate, or alkali alcoholates such as sodium methylate. Hexahydrotriazines can also be used as a catalysts.

The reaction between NCO groups and Zerewitinoff-active hydrogen atoms is also considerably increased by lactams and azalactams, in the manner known in the art, whereupon an associative compound is first formed between the lactam and the compound which contains acidic hydrogen.

Organic compounds of metals, particularly organic compounds of tin, can also be used as catalysts. Apart from compounds which contain sulfur, such as di-n-octyl-tin mercaptide, the preferred tin compounds are tin(II) salts of carboxylic acids such as, for example, tin(II) acetate, tin(II) octoate, tin(II) ethylhexoate and tin(II) laurate, and tin(IV) compounds such as, for example, di-butyltin oxide, dibutyl-tin dichloride, dibutyltin diacetate, dibutyltin dilaurate, di-butyltin maleate or dioctyltin diacetate.

All the aforementioned catalysts can also of course be used as mixtures. Combinations of organic compounds of metals with amidines, aminopyridines or hydrazinopyridines are of particular interest in this respect.

The catalysts are generally used in an amount between about 0.001 and 10% by weight, based on the total weight of compounds which contain least two hydrogen atoms capable of reacting with isocyanates (i.e., isocyanate-reactive compounds).

c) Surface-active additives, such as emulsifiers and foam stabilizers can also be used in the production of layer A). Examples of suitable emulsifiers include sodium salts of castor oil sulfonates or salts of fatty acids with amines such as diethylamine oleate or diethanol-amine stearate. Alkali or ammonium salts of sulfonic acids, such as those of dodecylbenzenesulfonic acid or of dinaphthylmethane-disulfonic acid or of fatty acids such as ricinolic acid or of polymeric fatty acids for instance, can also be used in conjunction as surface-active additives.

Suitable foam stabilizers mainly comprise polyether siloxanes, especially water-soluble representatives thereof. These compounds are generally synthesized so that a copolymer of ethylene oxide and propylene oxide is bonded to a polydimethyl-siloxane radical. Polysiloxane-polyoxyalkylene copolymers which are multiple-branched via allophanate groups are of particular interest.

d) Retarders, e.g., substances with an acidic reaction such as hydrochloric acid or organic acid halides, and also cell regulators of the type known in the art such as paraffins, fatty alcohols or dimethylpolysiloxanes, as well as pigments or colorants and flame retardants of the type known in the art, e.g. trischloroethyl phosphate, tricresyl phosphate or ammonium phosphate and polyphosphate, and also stabilizers against the effects of ageing and weathering, plasticizers, and substances which exert a fungistatic or bacteriostatic effect, as well as fillers such as barium sulfate, carbon black or whitening.

Other examples of surface-active additives and foam stabilizers, and of cell regulators, retarders, stabilizers, flame-retardant substances, plasticizers, colorants and fillers, and of substances which exert a fungiostatic or bacteriostatic effect, all of which can be used in conjunction according to the invention, are described below.

Suitable thermoplastic plastics materials to be used as layer B) include all known thermoplastics, preferably thermoplastic polyolefins, such as polypropylene or polyethylene, polycarbonates, polyester carbonates, styrene copolymers, graft styrene copolymers which contain rubber, such as ABS polymers, polyamides and/or thermoplastic mixtures thereof.

The following polymers are particularly suitable as the thermoplastic plastics material for layer B):

Polyolefins, such as high- and low-density polyethylene which can be produced by known methods.

Polyolefins, such as high- and low-density polyethylene, i.e. polyethylene with a density ranging from 0.91 $g/cm^3$ to 0.97 $g/cm^3$, which can be produced by known methods.

Polypropylenes with weight average molecular weights from 10,000 g/mol to 1,000,000 g/mol, and which can be produced by known methods, are also suitable.

It is also possible to use copolymers of the aforementioned olefins or copolymers thereof with other olefins such as, for example:

polymers of ethylene with butene, hexene and/or octene;
EVAs (ethylene-vinyl acetate copolymers);
EEAs (ethylene-ethyl acrylate copolymers);
EBAs (ethylene-butyl acrylate copolymers);
EASs (ethylene-vinylcarbazole copolymers);
EPBs (ethylene-propylene block copolymers);
EPDMs (ethylene-propylene-diene copolymers);

PB (polybutylene);
PMP (polymethylpentene);
PIB (polyisobutylene);
methyl-butylene copolymers;
and
isoprene-isobutylene copolymers.

Methods of producing polymers such as these are known.

Thermoplastic plastics materials which are particularly suitable for layer B) of the composite according to the invention also include thermoplastic, aromatic polycarbonates, and particularly those based on diphenols of formula (I)

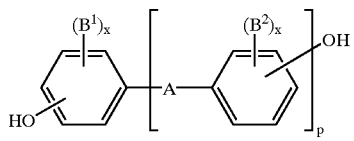
(I)

wherein:

A represents a single bond, a $C_1$–$C_5$ alkylene radical, a $C_2$–$C_5$ alkylidene radical, $C_5$–$C_6$ cycloalkylidene radical, —S—, —$SO_2$—, —O—, —CO—, or a $C_6$–$C_{12}$ arylene radical, which can optionally be condensed with further aromatic rings that contain hetero atoms;

$B^1$ and $B^2$: each independently represent a $C_1$–$C_8$ alkyl radical, a $C_6$–$C_{10}$ aryl radical, most preferably a phenyl radical, a $C_7$–$C_{12}$ aralkyl radical, preferably a benzyl radical, or a halogen atom, preferably chlorine or bromine;

each x: independently represents 0, 1 or 2, and p represents 0 or 1;

or alkyl-substituted dihydroxyphenylcycloalkanes of formula (II),

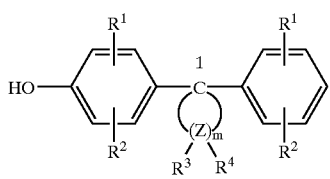
(II)

wherein:

$R^1$ and $R^2$: each independently represent a hydrogen atom, a halogen atom, preferably chlorine or bromine, a $C_1$–$C_8$ alkyl radical, a $C_5$–$C_6$ cycloalkyl radical, a $C_6$–$C_{10}$ aryl radical, preferably a phenyl radical, or a $C_7$–$C_{12}$ aralkyl radical, preferably a phenyl-$C_1$–$C_4$ alkyl radical, particularly a benzyl radical;

m represents an integer from 4 to 7, preferably 4 or 5, $R^3$ and $R^4$: are independently selected for each individual Z, and each represents, independently of each other, a hydrogen atom, or a $C_1$–$C_6$ alkyl radical, preferably a hydrogen atom, a methyl radical or an ethyl radical, and Z represents carbon, with the proviso that on at least one Z atom, $R^3$ and $R^4$ simultaneously denote an alkyl radical.

Examples of suitable diphenols of formnula (I) include hydroquinone, resorcinol, 4,4'-di-hydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxy-phenyl)-propane and 2,2-bis-(3,5-dibromo-4-hydroxyphenyl)-propane.

The preferred diphenols of formula (I) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

The preferred diphenols of formula (II) are dihydroxydiphenylcyclo-alkanes comprising 5 and 6 ring C (carbon) atoms in their cycloaliphatic radical [(m=4 or 5 in formula (II)], such as diphenols corresponding to the formulae:

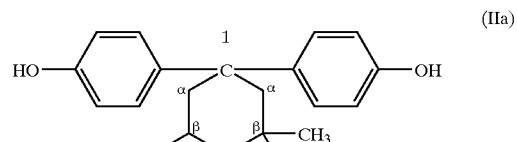
(IIa)

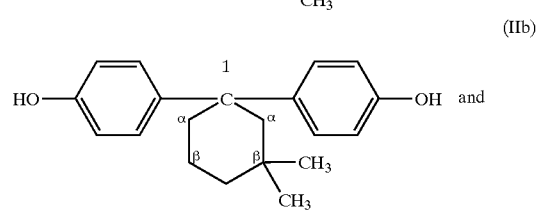
(IIb)

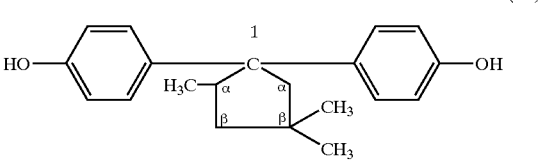
(IIc)

wherein 1,1-bis-(4-hydroxyphenyl)-3,3,5-trimethylcyclohexane (formula (IIa)) is particularly preferred.

The polycarbonates which are suitable according to the invention can be branched in the known manner, preferably by the incorporation of 0.05 to 2.0 mol %, with respect to the sum of the diphenols used, of trifunctional compounds or of compounds with a functionality greater than three, such as those comprising three or more phenolic groups such as, for example:

phloroglucinol,
4,6-dimethyl-2,4,6-tri-(4-hydroxyphenyl)-heptene-2,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-(4,4-bis-(4-hydroxyphenyl)-cyclohexyl)-propane,
2,4-bis-(4-hydroxyphenyl)-isopropyl)-phenol,
2,6-bis-(2-hydroxy-5'-methyl-benzyl)-4-methylphenol,
2-(4-hydroxyphenyl)-2-(2,4-dihydroxyphenyl)-propane,
hexa-(4-(4-hydroxyphenyl-isopropyl)-phenyl) orthoterephthalic acid esters,
tetra-(4-hydroxyphenyl)-methane,
tetra-(4-(4-hydroxyphenyl-isopropyl)-phenoxy)-methane, and
1,4-bis-((4',4''-dihydroxytriphenyl)-methyl)-benzene.

Some of the other tri-functional compounds which can be used include, for example, 2,4-dihydroxybenzoic acid, trimesic acid, cyanuric chloride and 3,3-bis-(3-methyl-4-hydroxyphenyl)-2-oxo-2,3-dihydroindole.

In addition to bisphenol A homopolycarbonates, the preferred polycarbonates are copolycarbonates of bisphenol A comprising up to 15 mol% of 2,2-bis-(3,5-dibromo-4-hydroxyphenyl)-propane with respect to the molar sum of diphenols.

The aromatic polycarbonates which are used for the production of layer B) of the composite can be replaced in part by aromatic polyester carbonates.

Aromatic polycarbonates and/or aromatic polyester carbonates suitable as a thermoplastic plastics material for layer B) are known from the literature or can be produced by methods which are known from the literature.

Aromatic polycarbonates and/or aromatic polyester carbonates can be produced, for example, by the reaction of diphenols with carbonic acid halides, preferably phosgene, and/or with aromatic dicarboxylic acid dihalides, preferably benzene-dicarboxylic acid dihalides, by the phase boundary method, optionally, in combination with chain terminators, and optionally, in combination with trifunctional branching agents or of branching agents with a functionality greater than three.

Other materials which are suitable to be used as thermoplastic plastics materials for layer B) are styrene copolymers of one or of at least two ethylenically unsaturated monomers (vinyl monomers), such as styrene, α-methylstyrene, styrenes comprising substituted nuclei, acrylonitrile, methacrylonitrile, methyl methacrylate, maleic anhydride, N-substituted maleinimide and esters of (meth)acrylic acid comprising 1 to 18 C atoms in their alcohol component.

These copolymers are resin-like, thermoplastic and free from rubber.

The preferred styrene copolymers are those comprising at least one monomer from the series comprising styrene, α-methylstyrene and/or styrenes comprising a substituted nucleus, with at least one monomer from the series comprising acrylonitrile, methacrylonitrile, methyl methacrylate, maleic anhydride and/or N-substituted maleinimide.

The ratios by weight which are particularly preferred in the thermoplastic copolymer are 60 to 95% by weight of styrene monomers and 40 to 5% by weight of other vinyl monomers (based on 100% by weight of the copolymer).

Copolymers which are particularly preferred are those of styrene with acrylonitrile and, optionally, with methyl methacrylate, of α-methylstyrene with acrylonitrile and, optionally, with methyl methacrylate, or of styrene and α-methylstyrene with acrylonitrile and, optionally, with methyl methacrylate.

Styrene-acrylonitrile copolymers are known and can be produced by radical polymerization, particularly by emulsion, suspension, solution or bulk polymerization. These copolymers preferably have molecular weights $M_w$ (weight average molecular weights, as determined by light scattering or sedimentation) between 15,000 and 200,000.

The copolymers which are particularly preferred also include randomly structured copolymers of styrene and maleic anhydride, which are preferably produced by continuous bulk or solution polymerization of the corresponding monomer, with incomplete conversion.

The proportions of the two components of randomly structured styrene-maleic anhydride copolymers which are suitable according to the invention can be varied within wide limits. The preferred content of maleic anhydride is 5 to 25% by weight.

Instead of styrene, the polymers can also contain styrenes comprising a substituted nucleus, such as p-methylstyrene, 2,4-dimethyl-styrene and other substituted styrenes, such as α-methyl-styrene.

The molecular weights (number average; $M_n$) of the styrene-maleic anhydride copolymers can vary over a wide range. The range of from 60,000 to 200,000 is preferred. A limiting viscosity of 0.3 to 0.9 (as measured in dimethylformamide at 25° C.) is preferred for these products.

Graft copolymers are also suitable as thermoplastic plastics materials for layer B). These comprise graft copolymers which exhibit rubber-like elastic properties can essentially be obtained from at least 2 of the following monomers: chloroprene, 1,3-butadiene, isoprene, styrene, acrylonitrile, ethylene, propylene, vinyl acetate and esters of (meth) acrylic acid comprising 1 to 18 C atoms in their alcohol component. The preferred graft polymers are partially crosslinked and have gel contents greater than 20% by weight, preferably greater than 40% by weight, and particularly preferably greater than 60% by weight.

Examples of graft copolymers which are preferably used include copolymers of styrene and/or acrylonitrile and/or (meth)acrylic acid alkyl esters which are grafted on to polybutadiene, EPDM, butadiene/styrene copolymers or acrylate rubbers; polybutadiene grafted with acrylic or methacrylic acid alkyl esters, vinyl acetate, acrylonitrile, styrene and/or alkyl-styrenes, butadiene/styrene- or butadiene/acrylonitrile copolymers, polyisobutene or polyisoprene.

The ABS polymers which are known in the art are polymers which are particularly preferred.

The graft polymers can be produced by known methods such as bulk, suspension, emulsion, or bulk suspension methods.

Thermoplastic polyamides which can be used for the composites according to the invention include polyamide 66 (polyhexamethylene adipinamide) or polyamides of cyclic lactams comprising 6 to 12 C (carbon) atoms, preferably laurolactam, and most preferably ε-caprolactam=polyamide 6 (polycaprolactam) or copolyamides with 6 or 66 as major constituents, or blends comprising said polyamides as a major constituent. The preferred polyamide is polyamide 6 produced by activated anionic polymerization or is a copolyamide with polycaprolactam as a major constituent which is produced by activated anionic polymerization.

On an industrial scale, the anionic polymerization of lactams to form polyamides is conducted by first producing a solution of the catalyst in the lactam, optionally, together with an impact resistance modifier, and second, by producing a solution of an activator in the lactam, wherein the compositions of these two solutions is usually such that the desired overall formulation is obtained by combining them in an equal ratio. This is not necessary, however. Other compositions can also be selected, for example, a concentrated melt containing the activator and catalyst can be added to a lactam melt. Other additives can be introduced depending on their compatibility with the melt containing the activator or catalyst, or possibly with that containing the lactam.

Polymerization is effected by mixing the individual solutions at temperatures between 80° C. to 200° C., preferably at 100° C. to 140° C., to produce the overall formulation.

The suitable catalyst is an alkali or alkaline earth lactamate, and is preferably used as a solution in the lactam. Sodium caprolactamate in ε-caprolactam is particularly preferred.

Activators in the sense of the present invention can comprise N-acyl-lactams or acid chlorides, or preferably aliphatic isocyanates, most preferably oligomers of hexamethylene diisocyanate. Either the pure substance, or preferably a solution such as, for example, a solution in N-methylpyrrolidone, can be employed as the activator.

The composites can be produced in the known manner. Layer B) of the composite is preferably prefabricated from thermoplastic polymers, and the polyurethane reaction system is deposited and reacted thereon. Depending on the reactivity of the polyurethane reaction components, these can already be premixed or can be mixed in the known manner during deposition. Deposition is preferably effected by spraying, by doctor blade or by calendering. It is also possible, however, to produce the composites according to the invention by coextrusion, using known methods. The particulate material is preferably introduced into one of the polyurethane reaction components before the system is deposited.

In particular, the polyurethane reaction components are reacted by the single-stage method, by the prepolymer method or by the semi-prepolymer method which are known in the art. Details of processing devices are described in the Kunststoff-Handbuch, Volume VII, edited by Vieweg and Hochtlen, Carl-Hanser-Verlag, Munich 1966, e.g. on pages 121 to 205.

During the production of PU foamed material, foaming can also be effected in accordance with the present invention in closed molds. The reaction mixture here is introduced into a mold which already contains layer B) of the composite. Suitable mold materials include metals e.g. aluminium, or plastics e.g., epoxy resins.

The foamable reaction mixture foams in the mold and forms the composite molding. In-situ foaming can be conducted so that the molding has a cellular structure at its surface. It can also be conducted so that the molding has a solid skin and a cellular core (i.e., an integral skin foam or a compact skin foam). In this connection, a procedure can be employed in which the amount of foamable reaction mixture that is introduced into the mold is such that the foamed material which is formed just fills the mold. A procedure can also be employed, however, in which the amount of foamable reaction mixture introduced into the mold is more than that which is necessary to fill the interior of the mold with foamed material. In the latter case, an "over-charging" procedure is employed, as is known in the art.

"External parting agents", such as silicone oils, are often used in conjunction during in situ foaming. What are termed "internal parting agents" can also be used, however, optionally in admixture with external parting agents.

Cold setting foamed materials can also be produced according to the invention.

Foamed materials can also of course be produced by block foaming, or by the double conveyor belt method which is known in the art and which is preferred for the continuous production of composites according to the invention.

In these procedures also, the particulate material is distributed in one reaction component before the PUR components react.

The production of polyurethane composite bodies with a sandwich form of construction is also a preferred method. This method can be conducted either as a deposition method or as a shell formation method. Both the deposition method and the shell formation method are known in the art. In the deposition method (formation by filling), two half-shells (e.g. outer layers of plastics materials) are prefabricated, placed in a mold, and the cavity between the shells is foamed with the PUR foam. In the shell method of formation, a core of PUR foam is placed in a mold and is then clad with a suitable shell material, e.g., with one of the aforementioned thermoplastics. The shell formation method is preferred for the production of sandwich composite bodies.

In order to produce solid PUR materials, the two PU reaction components are reacted simply by mixing them at room temperature, as explained above.

Subsequent, further coating of layer A) can be effected by the customary, known methods of lacquering, metallizing or by applying a further coating of a polymeric layer (e.g., like that of layer A).

The composites according to the invention are preferably used in the production of motor vehicles, particularly for interior trim, e.g. as a coating material for dashboards or as soft trim for pillars.

As used herein, the term molecular weight refers to the number average molecular weight unless otherwise.

The invention is explained by the following examples.

EXAMPLES

The composite bonding was tested according to DIN 53 357, as follows:

Polymeric layer A) was deposited as a thin film on the support B) in accordance with the corresponding DIN standard. The force of separation during the separation of the composite was subsequently measured, e.g. by using a customary floating roller peel test according to DIN 53 357.

Example 1

50 g Aerosil-300 (Degussa) were suspended in 1 liter of toluene by means of an ultrasonic rod. 5 ml N-methylaminopropyltrimethoxysilane, 0.5 g p-toluenesulfonic acid, 0.1 g dibutyltin oxide and 2 g water were subsequently added, and the suspension operation was repeated. The solution was stirred for 8 hours at 110° C. under reflux. The solvent was removed in a rotary evaporator. The residue was suspended, together with 20 g of a polycarbonate based on bisphenol A (Mn=20,000 g/mol), in 1 liter of methylene chloride by means of the ultrasonic rod, and was subsequently stirred for 8 hours at 50° C. under reflux.

0.5 g of the cooled suspension were dissolved in 25 g of industrial 4,4'-diisocyanatodiphenylmethane, and the solvent was subsequently removed by stirring at 40° C. This mixture was mixed with 58 g of a trifunctional poly(ethylene oxide-propylene oxide) (mole fractions: 83:17, based on trimethylolpropane, OH number 28) and with 1.7 g water, and was cast onto a slab of polycarbonate based on bisphenol A (thickness: 4 mm) in a frame. The thickness of the foam layer of the polyurethane layer was about 1 cm.

Before the bonding test, the layered composite was subjected to 10 days' exposure in an alternating climate test (cycles of −40° C. to 80° C., and 0 to 80% relative humidity, 12 hour cycle time). The subsequent bonding test was performed using a 90° peel test (according to DIN 53 357—using the method described above) after reducing the foam thickness to 2 mm.

The peeling forces required for a sample 20 mm wide were >5N.

A polyurethane foam layer which contained no particles but which was otherwise produced in the same manner exhibited considerably inferior bonding, with peeling forces of 2±0.3 N for a composite comprising polycarbonate based on bisphenol A (thickness: 4 mm).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite material comprising at least two layers of different plastics materials which are directly bonded to each other, comprising A) one layer comprising polyurethane, and B) a second layer which is directly bonded to layer A), and comprising a thermoplastic plastics material which is different from A), wherein layer A) contains homogeneously distributed particles, which consist essentially of a polycarbonate or a polyester carbonate, and have a particle size of ≦50 nm, wherein the total surface area of the particles corresponds at least to the extent of the total interface between layers A) and B).

2. The composite material of claim 1, wherein the particles have a core comprising an inorganic material.

3. The composite material of claim 2, wherein the core comprises at least one oxide, hydrated oxide, nitride or carbide of silicon, aluminium, titanium, zirconium, cerium or bromine.

4. The composite material of claim 1, wherein layer A) of the composite comprises a polyurethane foam or a solid polyurethane layer.

5. The composite material of claim 1, wherein layer B) of the composite comprises a polyolefin, an ethylene-propylene copolymer, a polyamide, a polycarbonate, a polyester carbonate, a styrene copolymer or a corresponding graft copolymer or mixtures thereof.

6. A process for the production of a composite material comprising at least two layers of different plastics materials which are directly bonded to each other, comprising:

(1) applying (A) a polyurethane-forming reaction system comprising (a) an organic polyisocyanate component and (b) an isocyanate-reactive component, onto (B) a prefabricated thermoplastic polymer, wherein at least one of componenets (a) and (b) of the polyurethane-forming reaction system additionally comprises a particulate material which is coated with a thermoplastic plastics material which is different from the formed polyurethane, and the particulate material has a particle size of ≦50 nm;

and (2) allowing the polyurethane-forming reaction system to fully react to form a polyurethane layer, wherein said particulate material is homogeneously distributed in the polyurethane layer;

thereby forming a composite material comprising at least two layers, wherein the total surface area of the particulate material corresponds to at least the extent of the total interface between the two layers.

* * * * *